United States Patent [19]

Hilakos

[11] Patent Number: 4,778,367
[45] Date of Patent: Oct. 18, 1988

[54] ADJUSTABLE SIZING AND FORMING DIE

[75] Inventor: William Hilakos, Mt. Vernon, Ind.

[73] Assignee: General Electric Company, Mt. Vernon, Ind.

[21] Appl. No.: 133,404

[22] Filed: Dec. 15, 1987

[51] Int. Cl.[4] .................................................. B29C 47/02
[52] U.S. Cl. ................................... 425/113; 264/174; 264/279; 425/192 R; 425/466
[58] Field of Search ............... 425/113, 191, 192 R, 425/466, 461, 66; 264/174, 177.2, 177.13, 177.16, 279; 156/244.11, 244.12, 244.23, 500

[56] References Cited

U.S. PATENT DOCUMENTS

| | | | |
|---|---|---|---|
| 3,404,433 | 10/1968 | Krutchen et al. | 425/191 X |
| 3,694,131 | 9/1972 | Stuart | 425/461 |
| 3,773,449 | 11/1973 | Hager | 425/466 X |
| 4,043,720 | 8/1977 | Mercer | 425/113 |
| 4,081,232 | 3/1978 | Pemberton et al. | 156/244.12 X |
| 4,150,929 | 4/1979 | Brandt | 425/466 X |
| 4,312,917 | 1/1982 | Hawley | 264/279 X |
| 4,364,722 | 12/1982 | Phipps | 425/192 R |
| 4,668,173 | 5/1987 | Garner et al. | 264/174 X |
| 4,734,240 | 3/1988 | Chung et al. | 264/177.16 X |

Primary Examiner—Richard L. Chiesa
Attorney, Agent, or Firm—Joseph T. Eisele; Martin B. Barancik

[57] ABSTRACT

A sizing and/or forming die is employed in the pultrusion of filament or fiber reinforced thermoplastic resins such as polycarbonates. The die is adjustable on-line to change the ratio of resin to reinforcement at will and without interrupting the production process.

7 Claims, 2 Drawing Sheets

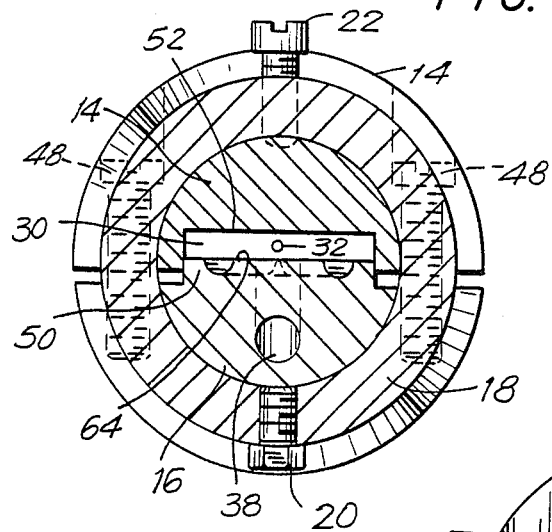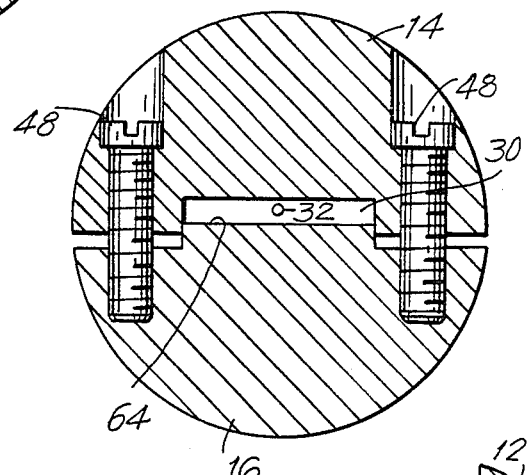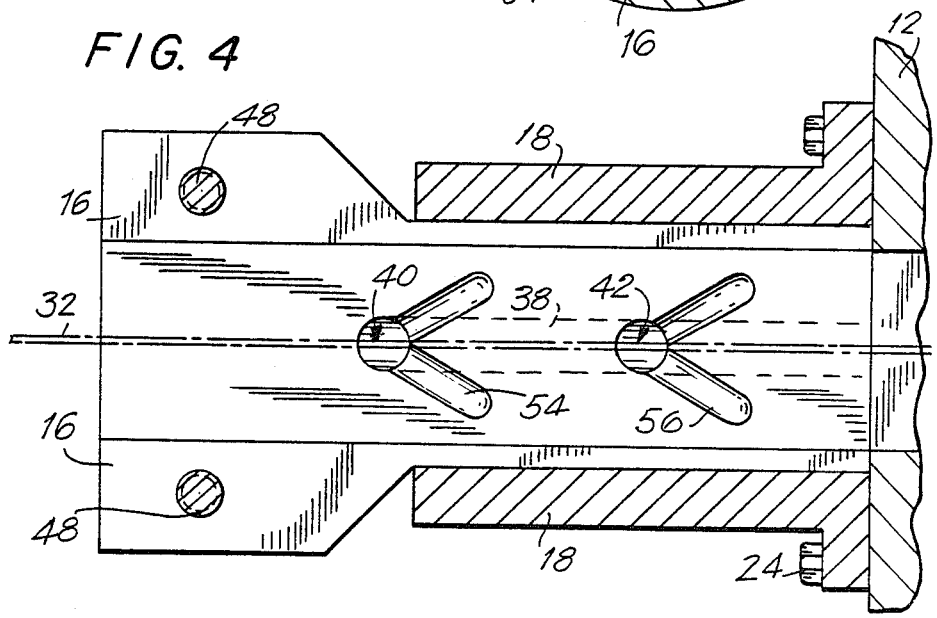

ADJUSTABLE SIZING AND FORMING DIE

BACKGROUND OF THE INVENTION

1. Field of the Invention

The invention relates to dies for shaping and sizing continuous lengths of filament reinforced, synthetic polymeric resins.

2. Brief Description of the Prior Art

Methods and apparatus for impregnating continuous lengths of textile filaments or fibers such as continuous lengths of glass filament yarns are well known and produce, for example, yarns and tapes of glass filament reinforced plastics. Representative of the methods and apparatus are those described in the U.S. Pat. Nos. 3,694,131 and 4,312,917.

In the prior art apparatus, there is generally a component which finally shapes (forms) and/or sizes the resin impregnated continuous length. This die component is selected to provide a single diameter size and/or shape to the resin impregnated length. The size and/or shape is fixed and if the desired size and/or shape of the final article is to be changed, it is necessary to interrupt the production line and change the die component to a more appropriate one. Shut-downs, clean-ups and die changes are economically undesirable.

The die of the present invention is adjustable on-line, without interruption of production to change the die size (orifice) and thereby to some degree the shape of the product yarn or tape. Adjustment can be made to vary the resin content or resin/reinforement ratio of the product without interruption of the production line. This is an economic advantage.

SUMMARY OF THE INVENTION

The invention comprises a die for sizing and shaping a polymeric resin impregnated, continuous length of filaments or fibers, which comprises;

(A) a die body, which comprises;
  (1) a first die member, having a first end, a second end, an outer member surface extending between the first and the second ends, and an inner member surface extending in a plane substantially parallel to the outer member surface, between the first and the second ends; said inner member surface including a groove extending between the first and the second ends; and
  (2) a second die member having a first end, a second end, an outer member surface extending between the first and the second ends of the second die member, and an inner member surface extending in a plane substantially parallel to the outer member surface of the second die member, between the first and the second ends of the second die member; said inner member surface of the second die member including a raised portion extending from the first to the second end of the second die member, said raised portion being of a size and configuration to slidingly engage with and close the groove in the first die member; said second die member having
    (a) a bore therein from the second end of the second die member to a point intermediate between the first and the second end of the second die member; and
    (b) an open port allowing for fluid communication between the inner surface and the bore of the second die member;

(B) means for assembling the first die member together with the second die member, whereby the assembled die members form a channel bounded by the groove of the first member and the raised portion of the second die member, said channel being open at the first and the second ends of the assembled first and second die members whereby fluid communication exists from the first to the second ends through the assembled die body; and (C) means for moving one of the first die member and the second die member within the assembled die body, in relation to the other of the first and the second die members, whereby the space within the channel may be expanded and contracted.

BRIEF DESCRIPTION OF THE DRAWINGS

FIG. 2 is a view along lines 2—2 of FIG. 1.

FIG. 3 is a view along lines 3—3 of FIG. 1.

FIG. 4 is a view along lines 4—4 of FIG. 1.

DETAILED DESCRIPTION OF THE PREFERRED EMBODIMENTS OF THE INVENTION

Figure 1:
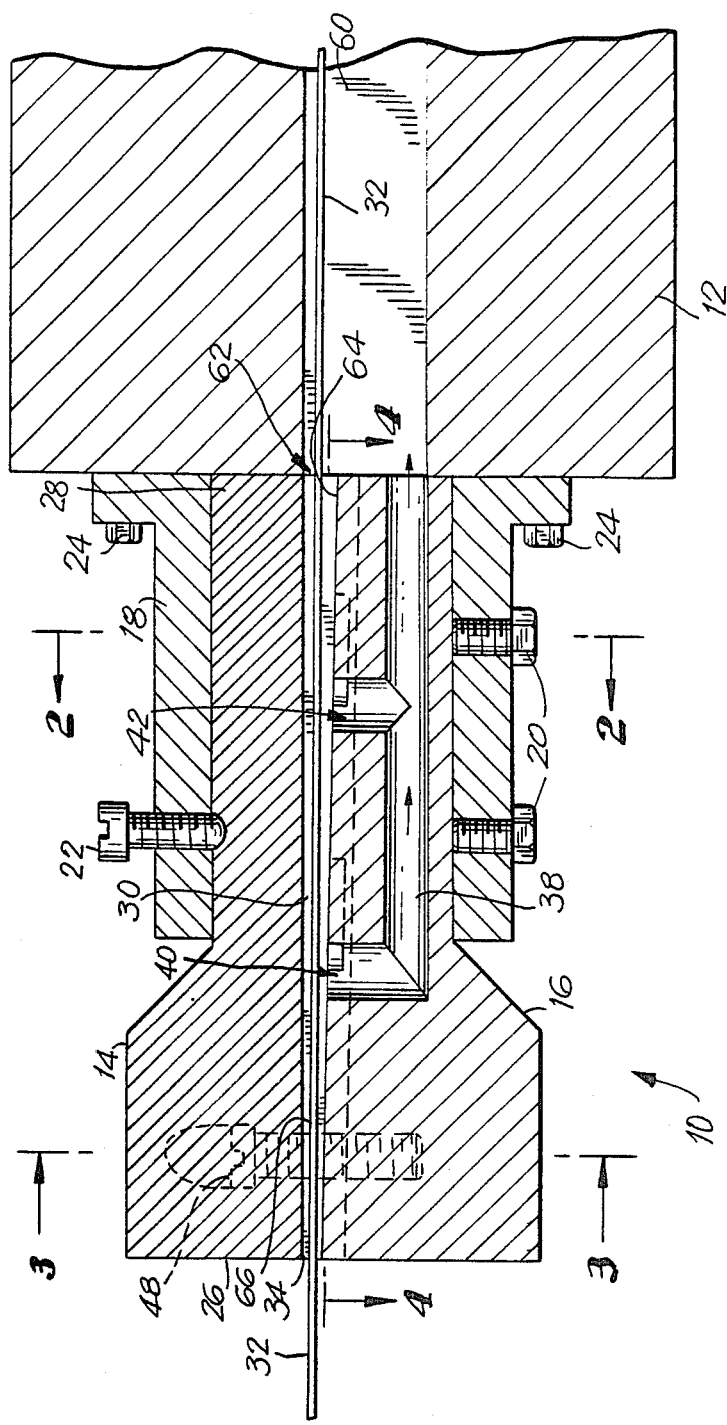
FIG. 1 is a cross-sectional side elevation of an embodiment die of the invention shown mounted on a yarn resin impregnator and in use.

Those skilled in the art will gain an appreciation of the invention from a reading of the following description of preferred embodiments in conjunction with a viewing of the accompanying drawings of FIGS. 1–4, inclusive.

FIG. 1 is a cross-sectional side elevation of an embodiment die 10 of the invention shown mounted on the exit port of a continuous yarn impregnator 12. The continuous yarn resin impregnator 12 may be any of those conventionally employed in the art to impregnate continuous lengths of filaments or fibers with polymeric resins. Representative of such impregnators are those described in the U.S. Pat. Nos. 3,694,131 and 4,312,917. It will be appreciated that the present invention is limited to the sizing/forming die described hereinafter. The die 10 of the invention comprises an upper die member 14 and a lower die member 16 held together in assembly by a sleeve 18. It will be appreciated that any conventional means such as, for example, metal bands may be employed to hold the members 14, 16 together in a spaced relationship as shown in the FIG. 1. In the embodiment die 10 of the invention, the sleeve 18 is fixedly secured to the lower member 16 through the agency of a plurality of bolts 20. The upper member 14 is pivotably secured to the sleeve 18 through the agency of a pivot pin 22. The sleeve 18 is secured to the impregnator 12 through the agency of bolts 24, thereby securing the entire assembly of die 10 to the impregnator 12. The die 10 has a first end 26 and a second end 28 as shown in FIG. 1. As also shown in FIG. 1, the die 10 body is traversed from end 26 to end 28 by a channel 30, providing open fluid communication between the ends 26, 28. Passing through the channel 30 from the impregnator 28 for illustrative purposes, is a continuous length of yarn 32 which is received into the die 10, shaped and sized as will be discussed hereinlater, and pultruded from the orifice 34 of die 10. Partially penetrating the lower member 16 of the assembled die 10 is a bore 38. The bore 38 provides a molten resin return from channel 30, through ports 40, 42, to the resin impregnator 12. This structure of the die 10 will be described more fully hereinafter. Adjacent to end 26 of die 10 is an adjusting screw 48 which functions to move the upper member 14 about its pivot point 22 so that the groove 30 space may be expanded and contracted on either side of the pivot point 22. In this way, the dimension of the orifice 34 may be changed as desired during in-line operation of the impregnator 12 and die 10, to size and impart a final shape to the continuous length of yarn 32 as it passes from the die 10.

FIG. 2 is a view along lines 2—2 of FIG. 1 and shows further details of the die 10, including a plurality of adjusting screws 48 for adjusting and maintaining the dimensions within groove 30. As may be seen in the FIG. 2, the lower member 16 bears a raised portion 50 on its upper surface, which slidingly engages in a groove 52 in the lower surface of the upper member 14, to form a closed groove or channel 30.

FIG. 3 is a view along lines 3—3 of FIG. 1 and again shows further details of the die 10. The surface 64 shown in FIG. 3 is the upper surface of the raised portion of lower member 16.

FIG. 4 is a view along lines 4—4 of FIG. 1 and shows diversion channels 54, 56 for diverting molten resin into the portals 40, 42. These diversion channels 54, 56 will be described in more detail hereinafter, in relation of the operation of the die 10. The die 10 may be fabricated from any convenient and known material normally employed to fabricate sizing die components for use in pultrusion of reinforced thermoplastic or thermoset materials. Advantageously, the die 10 is fabricated from aluminum or steel.

The operation of the die 10 may be as follows:

The yarn 32 undergoing pultrusion through a molten resin bath 60 (see FIG. 1) is discharged from the resin impregnator 12 through an outlet orifice 62 and directly into the channel 30 of die 10. Pultrusion continues to track the impregnated yarn 32 out of the orifice 34 of the sizing and forming die 10. The channel 30 is of variable dimensions since the surface 64 of the raised portion of lower member 16 tapers upwards from orifice 62 to the point 66, on the surface 64. Thus, the surface 64 is inclined upward between port 62 and point 66 on the surface 64. The zone between point 66 and the exit orifice 34 is substantially flat. During operation, resin 60 accompanying yarn 32 into the channel 30 is of course in a molten, thermoplastic condition. The molten, thermoplastic resin 60 is under relatively high pressure (as normally found in a yarn impregnator). The pressurized molten, thermoplastic polymeric resin forces the upper member 14 of die 10 away from the fixed-in-position lower member 16. This pressure forces member 14 against the pivot point 22 causing a downward pressure on the adjusting screws 48. The screws 48 can be adjusted to attain the desired orifice 34 opening to size and shape yarn 32 within the zone between the orifice 34 and point 66 on the surface 64. Excess resin 60, wiped from the pultruded yarn 32 is channeled back to impregnator 12 by collection in the diversion channels 54, 56 which divert excess resin through ports 40, 42 and into the bore 38, for ultimate return as shown by the arrows in FIG. 1, to the impregnator 12. In this way, reinforced thermoplastic resin lengths are obtained of any predetermined resin content. To change the resin to reinforcement ratio, i.e.; to increase or decrease resin weights one may adjust the orifice 34 opening through the agency of the adjusting screws 48 even while yarn 32 continues to be pultruded through the die 10. There need be no interruption of the production line during adjustment of the orifice 34.

Although the inclined surface between orifice 62 and point 66 on the surface 64 is not critical, it advantageously is a 1° to 5° incline.

Those skilled in the art will appreciate that many variations may be made to the above-described preferred embodiment of die 10, without departing from the spirit and scope of the invention. For example, although not entirely necessary, a heating means may be associated with the die assembly 10 to maintain thermoplasticity of the resin 60 while it is resident within the die 10. Generally however, sufficient heat is transmitted from the impregnator 12 so that additional means associated exclusively with the die 10 is not necessary.

What is claimed is:

1. A die for sizing and shaping a polymeric resin impregnated, continuous length of filaments or fibers, which comprises;
(A) a die body, which comprises;
   (1) a first die member, having a first end, a second end, an outer member surface extending between the first and the second ends, and an inner member surface extending in a plane substantially parallel to the outer member surface, between the first and the second ends; said inner member surface including a groove extending between the first and the second ends; and
   (2) a second die member having a first end, a second end, an outer member surface extending between the first and the second ends of the second die member, and an inner member surface extending in a plane substantially parallel to the outer member surface of the second die member, between the first and the second ends of the second die member; said inner member surface of the second die member including a raised portion extending from the first to the second end of the second die member, said raised portion being of a size and configuration to slidingly engage with and close the groove in the first die member; said second die member having
      (a) a bore therein from the second end of the second die member to a point intermediate between the first and the second ends of the second die member; and
      (b) an open port allowing for fluid communication between the inner surface and the bore of the second die member;
(B) means for assembling the first die member together with the second die member, whereby the assembled die members form a channel bounded by the groove of the first member and the raised portion of the second die member, said channel being open at the first and the second ends of the assembled first and second die members whereby fluid communication exists from the first to the second ends through the assembled die body; and
(C) means for moving one of the first die member and the second die member within the assembled die body, in relation to the other of the first and the second die members, whereby the space within the channel may be expanded and contracted.

2. The die of claim 1 wherein there are a plurality of open ports communicating between the inner surface of the second die member and the bore of the second die member.

3. The die of claim 2 wherein a plurality of grooves connect the surface of the raised portion of the second die member with the open ports.

4. The die of claim 1 wherein the means for assembling comprises a sleeve adapted by size and configuration to enclose at least partially the assembled first and second die members.

5. The die of claim 1 wherein the means for moving comprises an adjustable screw.

6. The die of claim 1 wherein the inner surface of the second die member inclines upward from the second end to a point intermediate between the first and the second ends of the second die member.

7. The die of claim 1 wherein the incline is at an angle of from 1° to 5° from the horizontal plane.

* * * * *